United States Patent Office 3,682,649
Patented Aug. 8, 1972

3,682,649
COLD WATER-PRESSURE EXTRACTION OF ROASTED COFFEE
George Orozovich, Flushing, N.Y., assignor to General Foods Corporation, White Plains, N.Y.
No Drawing. Filed Mar. 11, 1970, Ser. No. 18,749
Int. Cl. A23f *1/08*
U.S. Cl. 99—71    9 Claims

ABSTRACT OF THE DISCLOSURE

Roasted coffee, in form whole beans or ground, is contacted with cold water and the mixture is separated under pressure to obtain a quality coffee extract and partially extracted coffee which can be further processed. The coffee extract can be dried to obtain a premium soluble coffee. The partially extracted coffee can be further extracted by standard percolation techniques or can be dried and used as regular roasted and ground coffee.

BACKGROUND OF THE INVENTION

This invention concerns an improved method of extracting roasted coffee. More particularly, it pertains to a process wherein the coffee is extracted with cold water and the resultant extract and partially extracted coffee grounds are separated under pressure.

There are some prior art processes which disclose cold water extraction of roasted coffee. However, these processes are uneconomical due to the low yield of soluble solids obtained. In 1933, Copes in U.S. Pat. 1,933,049 disclosed pressing a mixture of cold water and ground green coffee to obtain a green coffee extract. The Copes process is unattractive as it requires roasting green extract to develop coffee flavor, a technique which has not yet been truly perfected.

SUMMARY OF THE INVENTION

It has now been discovered that a high quality, premium coffee extract can be prepared by mixing roasted coffee with cold water and subsequently separating the resultant extract and partially extracted coffee under pressure. The process, unexpectedly, is economical in that the partially extracted roasted coffee is suitable for further processing in a commercial percolation system to obtain a standard soluble coffee or for use as a regular roasted and ground coffee.

Apparently, the mild extraction conditions of the process of this invention do not significantly harm the quality of the roasted coffee. Also, it is possible that the pressure separation actually generates additional available soluble solids in the partially extracted, roasted coffee. In any event, it is a preferred embodiment of this invention to further utilize the partially extracted coffee as a regular coffee product.

As used in this invention regular coffee or regular roasted and ground coffee refers to the product normally sold to the housewife for home brewing coffee.

Roasted coffee as utilized in this invention refers to both the roasted whole bean, or the roasted bean which has been subdivided prior to further processing.

Fresh roasted and ground coffee refers to coffee which has not been subjected to the process of this invention.

DESCRIPTION OF THE PREFERRED EMBODIMENT

Roasted coffee is mixed with cold water and allowed to stand for a time sufficient to thoroughly wet the coffee. Preferably, the mixture is kept in agitation to insure intimate contact between the coffee and water. The coffee should not exceed 50% by weight of the mixture of coffee and water and it is preferred to use more water than coffee. The water to coffee ratio may vary from 7:1 to 1:1 by weight. The more water to coffee in the mixture, the more dilute will be the resultant extract and a preferred proportion in the mixture is two parts of water to one part of coffee.

The temperature of the water should not exceed room temperature and it is preferred to use water which is significantly below room temperature but above the freezing point of 32° F. A water temperature of about 40 to 50° F. is the most preferred temperature for the process of this invention.

The coffee and water mixture should be kept in contact for a sufficient time to thoroughly wet the coffee and partially extract the atmospherically soluble solids. The actual time will vary depending upon the temperature of the water and the grind size of the roasted coffee. Higher temperatures will require shorter times and finer ground coffee will require shorter contact times. Generally, the coffee and water should be in contact for about 5 to 15 minutes prior to subjecting the mixture to pressure.

When the roasted coffee is ground prior to use in the process of this invention, the grind size of the coffee will generally be governed by the subsequent use to which the partially extracted coffee is to be subjected. Thus, if the partially extracted coffee is to be used in a commercial percolation operation the grind size will be that suitable for such a percolation operation. If the coffee is to be used as a regular coffee subsequently, the grind size will be finer than that used in a commercial percolation system and corresponds to a grind size for such a regular coffee. After the coffee and water mixture has been held for the desired period of time the resultant extract is separated from the partially extracted coffee by subjecting the mixture to pressure. The pressing operation is performed in equipment which can retain the roasted and ground coffee and extrude the extract. Thus, the coffee water mixture can be put into a slotted cylinder which will permit the extract to pass through the slots as pressure is applied on the cylinder. Preferably, the use of a modified continuous extruder is considered desirable for continuously practicing the process of this invention. A continuous extruder such as an Anderson Expeller could be modified such that the feed portion of the unit was a solid cylinder for contacting the coffee and water. The remainder of the unit would have a slotted shell so that the extract would separate from the partially extracted grounds under increasing pressure as material is conveyed to the discharge end of the expeller. Alternatively, the mixture can be held in a separate vessel and continually fed to a press.

The coffee and water mixture should be subjected to a pressure of about 1,000 to 12,000 p.s.i.g. in the pressing operation. The pressure should be maintained for from 1 to 5 minutes and preferably from 2 to 3 minutes. A pressure of 8,000 to 12,000 p.s.i.g. is preferred.

The extract obtained via the process of this invention is a high quality extract which can be dried and utilized as a premium soluble coffee. It is preferred to dry the extract in a manner which will preserve the high quality such as by freeze drying.

The partially extracted coffee can be subjected to a standard percolation operation to obtain a high yield soluble coffee. Surprisingly, the quality of the coffee obtained when percolating the partially extracted coffee from the process of this invention is essentially the same as the quality of extract obtained when percolating freshly roasted and ground coffee. It may be preferred to mix the partially extracted coffee with freshly roasted and ground coffee prior to subjecting the material to a commercial percolation operation. When such a blending operation is performed it is desirable to use at least 50% freshly roasted and ground coffee. It may also be preferred to dry the partially extracted coffee to the same moisture content as freshly roasted and ground coffee prior to blending.

When the partially extracted coffee from the process of this invention is to be packaged as regular roasted and ground coffee it must first be dried to the moisture content for such a coffee, typically 3–5%. Any suitable drying method may be used. It is preferred to use gentle drying conditions such as those encountered in a vacuum drier. The dried coffee can be packaged separately or blended with untreated, freshly roasted and ground coffee prior to packaging. If a blend of material is used, the freshly roasted and ground coffee should comprise at least 50% by weight of the blend.

Example I

One part of coarse ground (ground on a Colton grinder through a 4 x 4 screen) was added to two parts of water at 50° F. The mixture was stirred occasionally and held in the mixing vessel for 10 minutes. The mixture was then poured into a Carver Press cylinder wherein the cylinder was slotted to permit the resultant extract to run off. A pressure of 1,000 p.s.i.g. was gradually applied to the coffee over the period of 3 minutes and held at the peak pressure for 10 seconds. The extract was collected in a cylinder below the press.

The resultant extract had a solids concentration of 10%. The solids in the extract represented about 13.5% by weight of the original roasted and ground coffee. This extract was flavor evaluated and found to be of extremely high quality.

The resultant extract was frozen and freeze dried to a moisture content of 3%. The resultant dry soluble coffee was again flavor evaluated and found to be of extremely high quality, comparable to extract obtained from freshly roasted and ground coffee in a home percolator.

The partially extracted roasted and ground coffee was judged suitable for use in a commercial percolation operation or after drying as a regular roasted and ground coffee.

Example II

The process of Example I was repeated using a pressure of 2,000 p.s.i.g. The resultant extract had a solids concentration of 9.3%. The solids in the extract represented about 12.1% by weight of the original roasted and ground coffee. This extract was flavor evaluated and found to be of extremely high quality.

Example III

Example I was repeated using a water temperature of 40° F. and a pressure of 1500 p.s.i.g. The extract concentration was 10.5% and represented a yield of approximately 14% by weight of the original roasted and ground coffee. The flavor of the extract was again found to be of extremely high quality.

Example IV

A water to coffee ratio of 3:1 was utilized and water at a temperature of 70° F. was used. The mixture was subjected to pressure as in Example I and a pressure of about 10,000 p.s.i.g. was applied. The resultant extract had a solids concentration of 9.5% and the solids in the extract represented a yield of about 17.5% by weight of the original roasted and ground coffee. The extract was flavor evaluated and again found to be of extremely high quality.

Example V

The partially extracted coffee from Example I was subdivided into two batches. One batch was dried in an infrared oven for 30 minutes to obtain roasted and ground coffee having a moisture content of 4.6%. The second batch was dried in a standard force draft oven for 4 hours at 180° F. to obtain roasted and ground coffee with a moisture content of 4.3%. The dried coffee from batch 1 and batch 2 were percolated in a standard Cory percolator for 7 minutes. The resultant brewed coffee were compared to a third pot of coffee prepared from untreated roasted and ground coffee on the same percolator. Expert panels evaluated the flavor and graded the resultant brewed coffees as follows: control (untreated brewed coffee), 4+; infrared sample, 6+; oven dried coffee, 4. Thus, it is apparent that the drying method effects the quality of subsequently prepared brewed coffee. It is also apparent that the flavor of a brewed cup of coffee prepared from roasted coffee which has been subjected to the process of this invention and subsequently dried is at least as good as brewed coffee prepared from untreated roasted and ground coffee.

What is claimed is:

1. A method of preparing a quality coffee extract consisting of:
   (a) mixing roasted coffee with cold water, the ratio of water to coffee being from 3:1 to 1:1 by weight, the temperature of the water being from 32° F. to 70° F.;
   (b) keeping the coffee in contact with the water for 5 to 15 minutes sufficient to completely wet said coffee, thus extracting soluble solids from the coffee and forming a mixture of partially extracted coffee and extract;
   (c) separating the partially extracted coffee and extract by pressing the mixture at a pressure from 1,000 to 12,000 p.s.i.g.; and
   (d) recovering the extract.

2. The process of claim 1 wherein the ratio of water to coffee is 2:1 to 1:1 and the temperature of the water is from 40° F. to 50° F. and further wherein the extract is recovered from pressing, frozen, and freeze dried to obtain a soluble coffee product.

3. The process of claim 1 wherein the mixture of partially extracted coffee and extract are separated in a continuous press.

4. The process of claim 1 wherein the roasted coffee is in the form of whole roasted coffee beans.

5. The process of claim 1 wherein the pressed and partially extracted coffee is ground, blended with at least 50% fresh roasted and ground coffee and subjected to a commercial percolation operation.

6. The process of claim 1 wherein the pressed and partially extracted coffee is ground, dried to a stable moisture content, blended with at least 50% fresh roasted and ground coffee and packaged for use in home brewing as a regular roasted and ground coffee.

7. The process of claim 1 wherein the roasted coffee is in the form of roasted and ground coffee.

8. The process of claim 1 wherein the pressed and partially extracted roasted and ground coffee is blended with at least 50% fresh roasted and ground coffee and subjected to a commercial percolation operation.

9. The process of claim 1 wherein the pressed and partially extracted roasted and ground coffee is dried to a stable moisture content, blended with at least 50% fresh roasted and ground coffee and packaged for use in home brewing as a regular roasted and ground coffee.

References Cited
UNITED STATES PATENTS

| | | | |
|---|---|---|---|
| 2,949,364 | 8/1960 | Bilenker | 99—71 |
| 3,224,879 | 12/1965 | Di Nardo | 99—71 |
| 1,933,049 | 10/1933 | Copes | 99—71 |
| 2,783,149 | 2/1957 | Epstein | 99—71 |
| 3,007,797 | 11/1961 | Tiktak et al. | 99—71 |

FRANK W. LUTTER, Primary Examiner

W. L. MENTLIK, Assistant Examiner